US012617520B1

(12) United States Patent
Funk

(10) Patent No.: US 12,617,520 B1
(45) Date of Patent: May 5, 2026

(54) COLLAPSIBLE WING FOR AIRCRAFT

(71) Applicant: Dwight Funk, Las Vegas, NV (US)

(72) Inventor: Dwight Funk, Las Vegas, NV (US)

( * ) Notice: Subject to any disclaimer, the term of this patent is extended or adjusted under 35 U.S.C. 154(b) by 0 days.

(21) Appl. No.: 19/282,432

(22) Filed: Jul. 28, 2025

(51) Int. Cl.
| *B64C 3/56* | (2006.01) |
| *B64C 3/18* | (2006.01) |
| *B64C 3/26* | (2006.01) |
| *B64U 30/10* | (2023.01) |

(52) U.S. Cl.
CPC .............. B64C 3/56 (2013.01); B64C 3/187 (2013.01); B64C 3/26 (2013.01); *B64U 30/10* (2023.01)

(58) Field of Classification Search
CPC .... B64C 3/26; B64C 3/56; B64C 3/46; B64C 1/063; B64C 1/30; B64U 30/12
See application file for complete search history.

(56) References Cited

U.S. PATENT DOCUMENTS

| | | | |
|---|---|---|---|
| 2,271,287 A | 1/1942 | Craigon | |
| 3,666,210 A * | 5/1972 | Look | B64C 3/56 |
| | | | 244/218 |
| 4,090,684 A * | 5/1978 | Look | B64C 3/56 |
| | | | 244/49 |
| 4,106,727 A * | 8/1978 | Ortell | F42B 10/18 |
| | | | 244/49 |

| | | | |
|---|---|---|---|
| 4,586,681 A | 5/1986 | Wedertz | |
| 8,262,032 B2 | 9/2012 | Sanderson | |
| 8,376,279 B2 * | 2/2013 | Parks | B64U 30/12 |
| | | | 244/49 |
| 9,789,950 B1 | 10/2017 | Most | |
| 10,696,376 B2 | 6/2020 | Ji | |
| 11,279,463 B2 | 3/2022 | Witt | |
| D1,058,473 S | 1/2025 | Amorosi | |
| 2020/0086970 A1 * | 3/2020 | Behzadpour | B64C 3/185 |
| 2023/0356826 A1 | 11/2023 | Thorwald | |
| 2025/0263164 A1 * | 8/2025 | Uskert | B64C 3/185 |

FOREIGN PATENT DOCUMENTS

| | | | | | |
|---|---|---|---|---|---|
| CN | 105398563 A | * | 3/2016 | ............... | B64C 3/18 |
| CN | 120246228 A | * | 7/2025 | ............... | B64C 3/56 |
| WO | WO2007084186 | | 7/2007 | | |

* cited by examiner

*Primary Examiner* — Joshua J Michener
*Assistant Examiner* — Ryan Andrew Yankey

(57) ABSTRACT

A collapsible wing includes a plurality of ribs, a connector, a plurality of pivot arms, and a cover panel. Each of the pivot arms is pivotably coupled to a trailing rib end portion of a respective one of the ribs in a scissor orientation. Each of the pivot arms is selectively movable between an unlocked position out of alignment with its respective trailing rib portion and a locked position in alignment with its respective trailing rib portion. The cover panel includes a first panel edge and a second panel edge. The first panel edge is coupled to the trailing rib end portion of each of the ribs. The second panel edge is coupled to each of the pivot arms, such that, upon movement of the pivot arms from the unlocked position to the locked position, the cover panel is stretched taut around the ribs and the connector.

16 Claims, 5 Drawing Sheets

COLLAPSIBLE WING FOR AIRCRAFT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to aircraft wings and more particularly pertains to a new collapsible wing that is lightweight and easy to transport and assemble. Aircraft wings are relatively large, even for small aircraft such as drones and unmanned aerial vehicles (UAVs). The new collapsible wing utilizes a lightweight frame and a flexible cover to allow for easy transport and assembly without sacrificing strength and durability.

(2) Description of Related Art Including Information Disclosed Under 37 CFR 1.97 and 1.98

The prior art relates to aircraft wings. The prior art, as best understood, does not disclose a collapsible wing includes a plurality of ribs, a connector to connect the ribs, a plurality of pivot arms, and a cover panel. Each of the pivot arms is positioned parallel and pivotably coupled to a trailing rib end portion of a respective one of the ribs in a scissor orientation. Each of the pivot arms is selectively movable between an unlocked position in which each of the pivot arms is out of alignment with its respective trailing rib portion and a locked position in which each of the pivot arms is in alignment with its respective trailing rib portion. The cover panel is coupled to the ribs and the pivot arms, such that, upon movement of the pivot arms from the unlocked position to the locked position, the cover panel is stretched taut around the ribs and the connector.

BRIEF SUMMARY OF THE INVENTION

An embodiment of the disclosure meets the needs presented above in a collapsible wing generally comprising a plurality of ribs, a connector, a plurality of pivot arms, and a cover panel. Each of the ribs includes a leading rib end portion, a central rib portion, and a trailing rib end portion. The connector is connected to the leading rib end portion of each of the ribs. The connector is elongated. Each of the pivot arms is positioned parallel and pivotably coupled to a trailing rib end portion of a respective one of the ribs in a scissor orientation. Each of the pivot arms is selectively movable between an unlocked position in which each of the pivot arms is out of alignment with its respective trailing rib portion and a locked position in which each of the pivot arms is in alignment with its respective trailing rib portion. The cover panel is positioned to surround the connector, the ribs, and the pivot arms. The cover panel includes flexible material. The cover panel includes a first panel edge and a second panel edge. The first panel edge is coupled to the trailing rib end portion of each of the ribs. The second panel edge is coupled to each of the pivot arms, such that, upon movement of the pivot arms from the unlocked position to the locked position, the second panel edge is moved immediately adjacent the first panel edge and the cover panel is stretched taut around the ribs and the connector.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
FIG. 1 is a perspective view of a collapsible wing according to an embodiment of the disclosure.

With reference now to the drawings, and in particular to FIGS. 1 through 5 thereof, a new collapsible wing embodying the principles and concepts of an embodiment of the disclosure and generally designated by the reference numeral 10 will be described.

Figure 2:
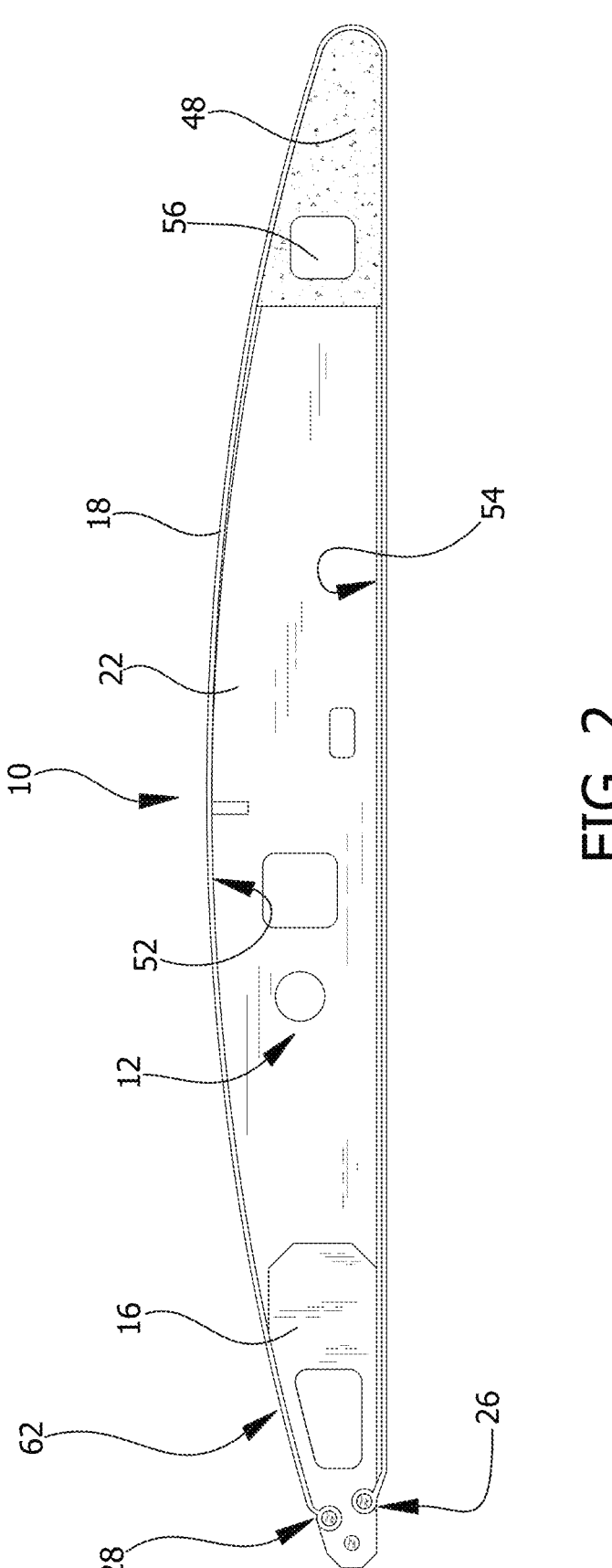
FIG. 2 is a right side view of an embodiment of the disclosure.

As best illustrated in FIGS. 1 through 5, the collapsible wing 10 generally comprises a plurality of ribs 12, a connector 14, a plurality of pivot arms 16, and a cover panel 18. As best seen in FIG. 2, each of the ribs 12 includes a leading rib end portion 20, a central rib portion 22, and a trailing rib end portion 24. In the exemplary embodiment in

3

FIG. 1, the connector 14 is connected to the leading rib end portion 20 of each of the ribs 12. The connector 14 is elongated. Each of the pivot arms 16 is positioned parallel and pivotably coupled to a trailing rib end portion 24 of a respective one of the ribs 12 in a scissor orientation. Each of the pivot arms 16 is selectively movable between an unlocked position 60, shown in FIG. 4, in which each of the pivot arms 16 is out of alignment with its respective trailing rib end portion 24, and a locked position 62, shown in FIG. 3, in which each of the pivot arms 16 is in alignment with its respective trailing rib end portion 24. The cover panel 18 is positioned to surround the connector 14, the ribs 12, and the pivot arms 16. The cover panel 18 includes flexible material. The cover panel 18 includes a first panel edge 26 and a second panel edge 28. The first panel edge 26 is coupled to the trailing rib end portion 24 of each of the ribs 12. The second panel edge 28 is coupled to each of the pivot arms 16, such that, upon movement of the pivot arms 16 from the unlocked position 60 to the locked position 62, the second panel edge 28 is moved immediately adjacent the first panel edge 26 and the cover panel 18 is stretched taut around the ribs 12 and the connector 14.

The cover panel 18 includes synthetic fibers of ultra-high-molecular-weight polyethylene (UHMWPE). One example of such material is Dyneema® manufactured by Avient Corporation. Dyneema and other UHMWPE fibers are known for their high tensile strength, light weight, and resistance to abrasion, moisture, UV light, and chemicals. The fibers can be up to 15 times stronger than steel by weight. The tensile strength can be in the range of 2.0 to 4.0 gigapascals.

Figure 5:
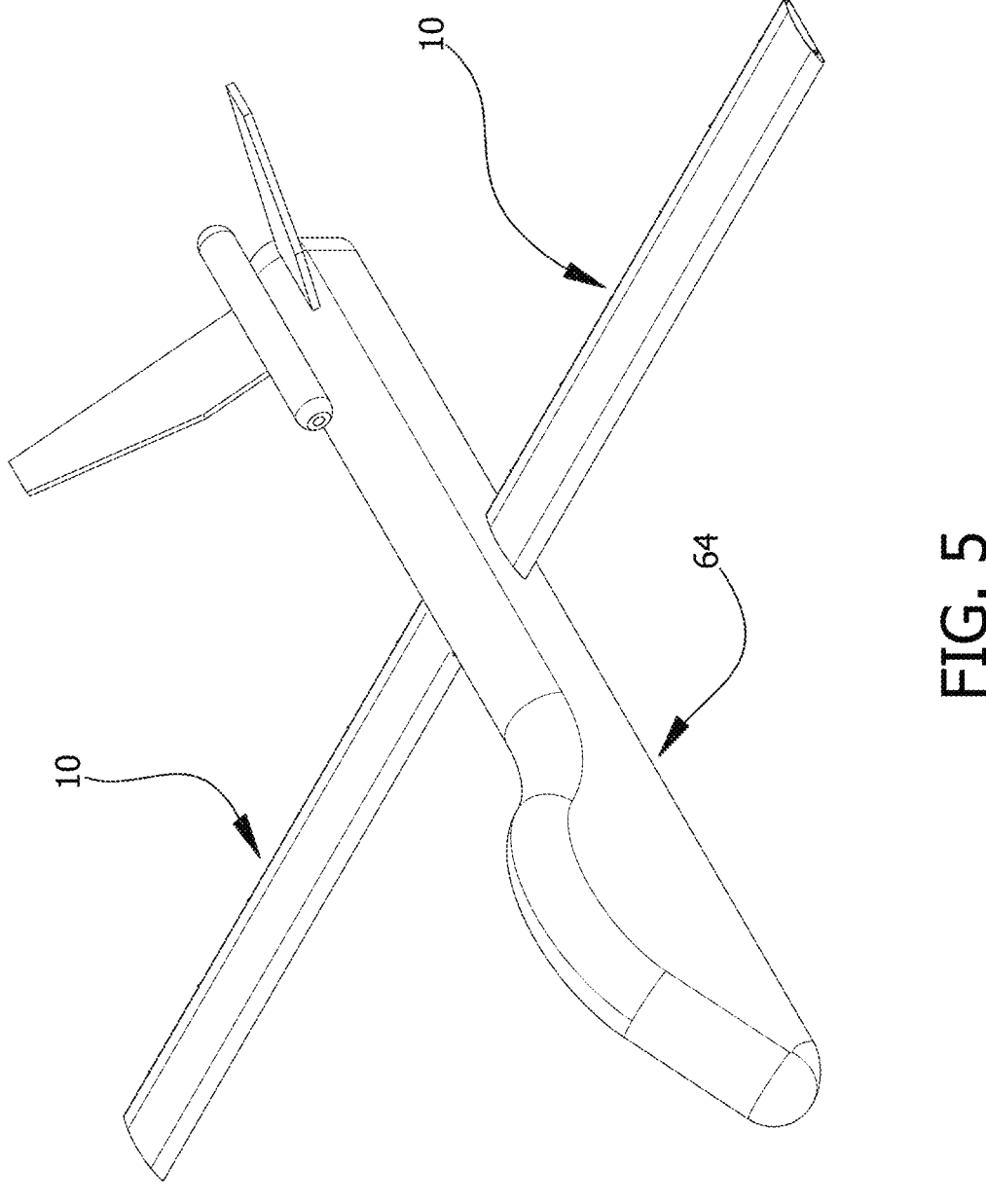
FIG. 5 is a perspective view of an embodiment of the disclosure in use.

By using UHMWPE, the collapsible wing 10 can have the strength of steel but the flexibility and light weight of a textile or cloth material. The collapsible wing 10 can be easily transported in a collapsed state, then quickly formed into the shape of a wing by pulling the cover panel 18 taut and locking it into position around the ribs 12 by a simple movement of the pivot arms 16. No additional securing mechanisms or tools are required. Due to the lightweight design and ease of manufacture, the collapsible wing 10 is especially useful for fast assembly of a UAV or a drone 64, an example of which is shown in FIG. 5.

Figure 3:
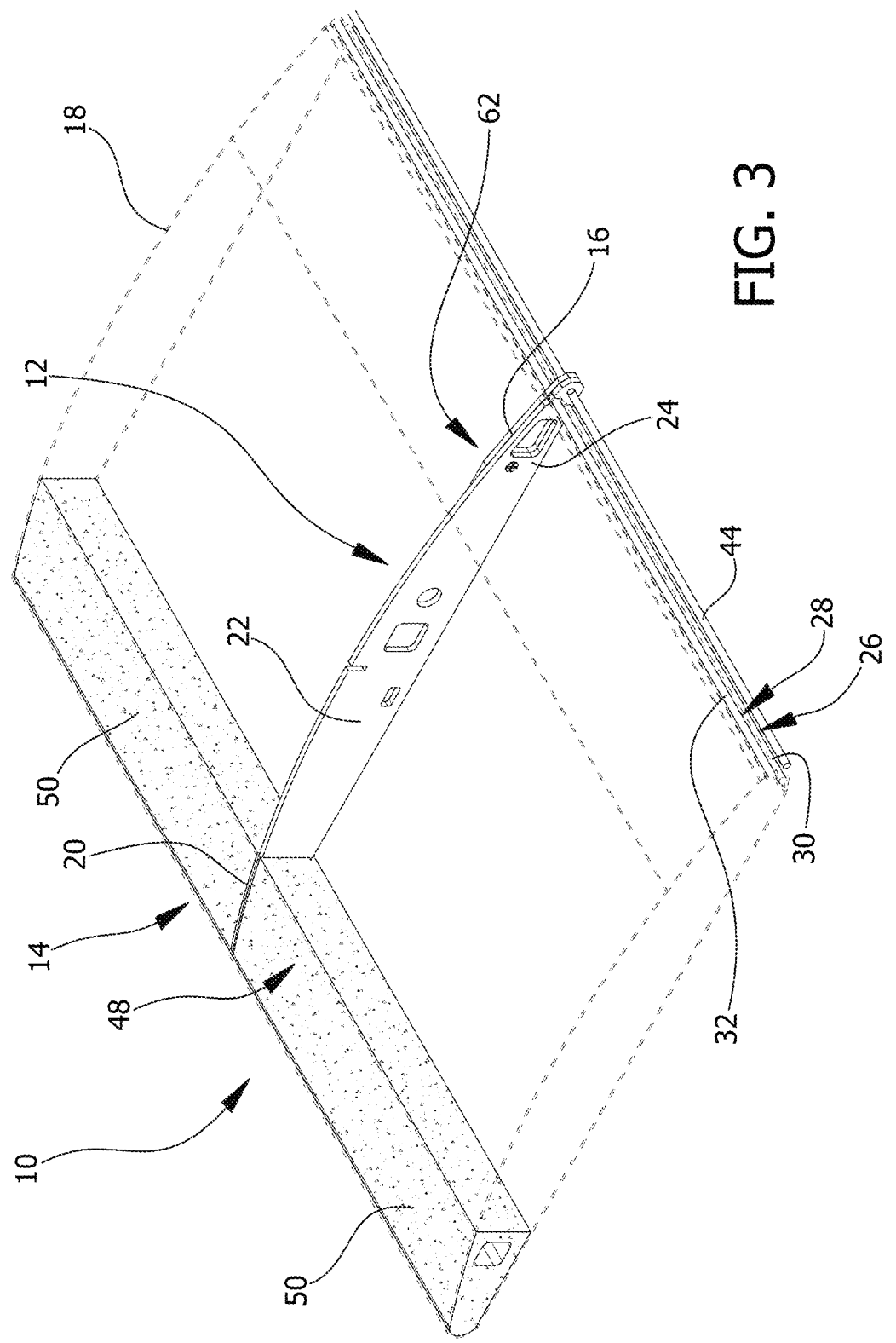
FIG. 3 is a close-up view of components of an embodiment of the disclosure.
Figure 4:
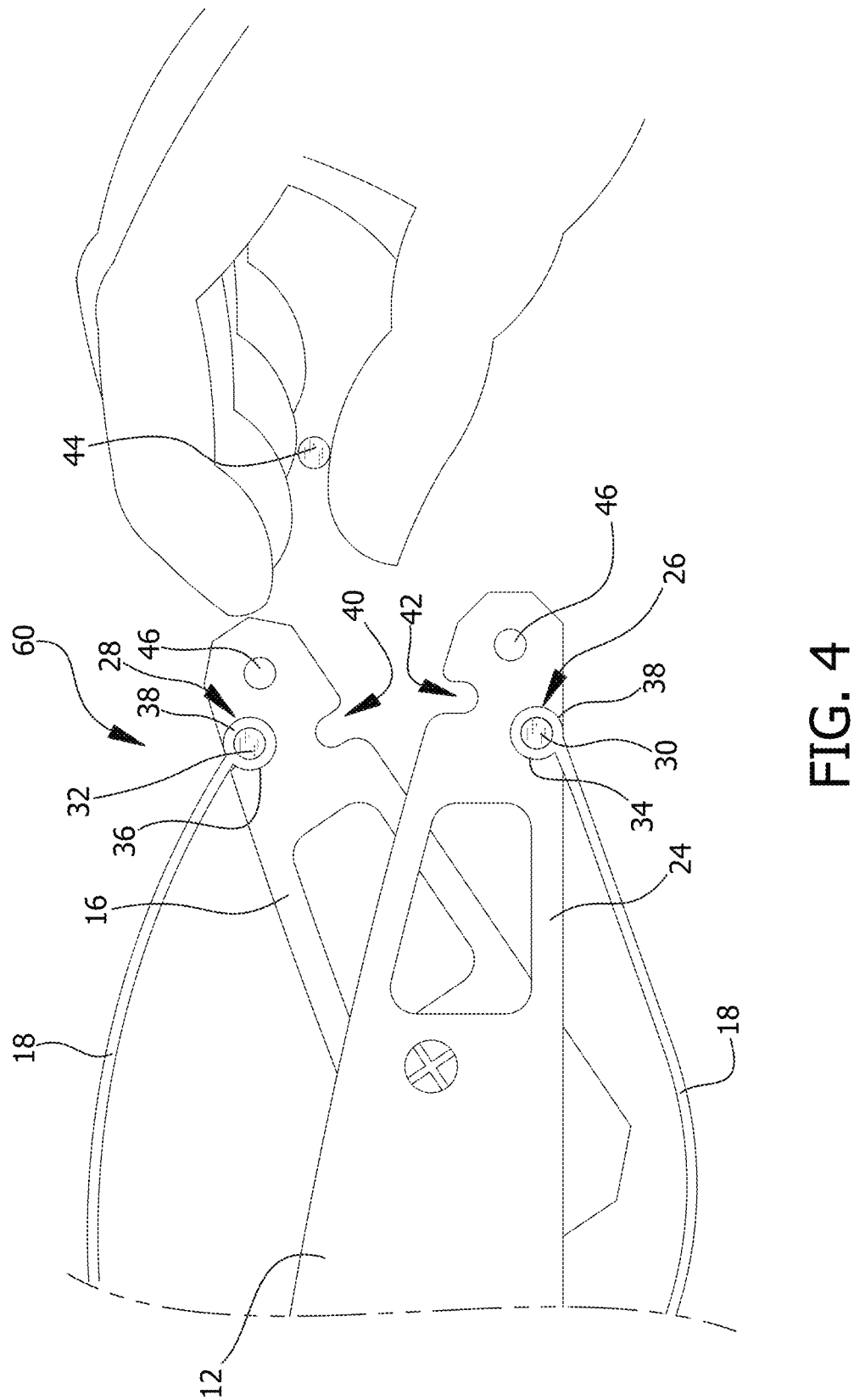
FIG. 4 is a close-up view of components of an embodiment of the disclosure in use.

In the exemplary embodiment in FIGS. 3 and 4, the cover panel 18 includes a first cover rod 30 and a second cover rod 32. The first cover rod 30 is positioned at and extends along the first panel edge 26. Each of the trailing rib end portions 24 includes a rib end opening 34 through which the first cover rod 30 passes to couple the first cover rod 30 to each of the ribs 12. The second cover rod 32 is positioned at and extends along the second panel edge 28. Each of the pivot arms 16 includes a pivot arm opening 36 through which the second cover rod 32 passes to couple the second cover rod 32 to each of the pivot arms 16.

In the exemplary embodiment in FIG. 4, the first panel edge 26 is in the form of a cylindrical loop 38 surrounding the first cover rod 30, and the second panel edge 28 and second cover rod 32 are similarly designed. This is only one exemplary embodiment, as the cover panel 18 could be secured in a different manner, such as by snaps or clasps or clips, or possibly by hook-and-loop material.

In the exemplary embodiment in FIG. 4, each of the trailing rib end portions 24 and each of the pivot arms 16 have the same profile such that, as shown in FIG. 2, each of the pivot arms 16 completely overlaps its respective trailing rib end portion 24 when in the locked position 62. However, in another possible embodiment, the pivot arms 16 and the trailing rib end portions 24 have different profiles. In the exemplary embodiment in FIGS. 3 and 4, each of the pivot arms 16 includes a pivot arm recess 40 to receive the first cover rod 30 when in the locked position 62, and each of the trailing rib end portions 24 includes a rib end recess 42 to receive the second cover rod 32 when in the locked position 62.

The collapsible wing 10 further includes a lock rod 44. Each of the trailing rib end portions 24 and each of the pivot arms 16 includes a lock opening 46, as shown in FIG. 4, designed to be aligned for insertion of the lock rod 44 to retain the pivot arms 16 in the locked position 62 and the cover panel 18 taut, as shown in FIGS. 2 and 3. The lock rod 44 is only one possible way to lock the pivot arms 16 in the locked position 62, as clips or clasps or other such structures could be used.

The connector 14 is an elongated foam structure 48 that has a cross-sectional profile matching a cross-sectional profile of each of the leading rib end portions 20 that tapers from a flat rear surface to a rounded front surface. In another possible embodiment, the elongated foam structure 48 and the leading rib end portions 20 have different cross-sectional profiles. In another possible embodiment, the leading rib end portion 20 is coupled to but separate from the central rib portion 22, and instead is joined to the elongated foam structure 48. In the exemplary embodiment in FIG. 1, the leading rib end portion 20 can include a connector opening 56 for insertion of a connector rod 58, which can provide mounting support and reinforcement for the elongated foam structure 48.

In the exemplary embodiment in FIG. 3, the elongated foam structure 48 includes a plurality of foam structure sections 50, each of which is positioned between and attached to a respective pair of the ribs 12. In another possible embodiment, the elongated foam structure 48 is a single piece with the leading rib end portions 20 inserted or embedded therein.

Each of the ribs 12 is flat and elongated. Each of the ribs 12 includes a curved upper edge 52 and a straight lower edge 54 to shape the cover panel 18 in a desired aerodynamic shape. In another possible embodiment, the straight lower edge 54 could be curved or have a curved portion. Other designs of the ribs 12 common to aircraft wings are within the scope of the disclosure. Each of the ribs 12 is oriented vertically on its straight lower edge 54. Each of the ribs 12 includes carbon fiber material, though other durable lightweight materials such as fiberglass or metal alloys could be used.

FIG. 4 shows the pivot arms 16 in the unlocked position 60. The cover panel 18 is loose and collapsible in this state, and thus easily transportable. When it is time to assemble the collapsible wing 10, the user moves the pivot arms 16 into alignment with the trailing rib end portions 24, that is, into the locked position 62. Since the first panel edge 26 is anchored to the ribs 12, the movement of the pivot arms 16 stretches the cover panel 18 taut over the ribs 12 to form the wing. The user can insert the lock rod 44 into the lock openings 46 to hold the pivot arms 16 in the locked position 62 and prevent the collapsible wing 10 from collapsing.

It is also contemplated that the same materials and structural elements can be used for assembling a fuselage and not just wings.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible wing comprising:
a plurality of ribs, each of the ribs including a leading rib end portion, a central rib portion, and a trailing rib end portion;
a connector, the connector being connected to the leading rib end portion of each of the ribs, the connector being elongated;
a plurality of pivot arms, each of the pivot arms being positioned parallel and pivotably coupled to a trailing rib end portion of a respective one of the ribs in a scissor orientation, each of the pivot arms being selectively movable between an unlocked position in which each of the pivot arms is out of alignment with its respective trailing rib portion and a locked position in which each of the pivot arms is in alignment with its respective trailing rib portion; and
a cover panel, the cover panel being positioned to surround the connector, the ribs, and the pivot arms, the cover panel comprising flexible material, the cover panel including:
a first panel edge, the first panel edge being coupled to the trailing rib end portion of each of the ribs; and
a second panel edge, the second panel edge being coupled to each of the pivot arms, such that, upon movement of the pivot arms from the unlocked position to the locked position, the second panel edge is moved immediately adjacent the first panel edge and the cover panel is stretched taut around the ribs and the connector.

2. The collapsible wing of claim 1, wherein the cover panel comprises synthetic fibers of ultra-high-molecular-weight polyethylene (UHMWPE).

3. The collapsible wing of claim 2, wherein:
the cover panel includes a first cover rod and a second cover rod;
the first cover rod is positioned at and extends along the first panel edge;
each of the trailing rib end portions includes a rib end opening through which the first cover rod passes to couple the first cover rod to each of the ribs;
the second cover rod is positioned at and extends along the second panel edge; and
each of the pivot arms includes a pivot arm opening through which the second cover rod passes to couple the second cover rod to each of the pivot arms.

4. The collapsible wing of claim 3, wherein:
each of the trailing rib end portions and each of the pivot arms have the same profile such that each of the pivot arms completely overlaps its respective trailing rib end portion when in the locked position;
each of the pivot arms includes a pivot arm recess to receive the first cover rod when in the locked position; and
each of the trailing rib end portions includes a rib end recess to receive the second cover rod when in the locked position.

5. The collapsible wing of claim 4, further comprising a lock rod, wherein each of the trailing rib end portions and each of the pivot arms includes a lock opening configured to be aligned for insertion of the lock rod to retain the pivot arms in the locked position and the cover panel taut.

6. The collapsible wing of claim 5, wherein the connector is an elongated foam structure having a cross-sectional profile matching a cross-sectional profile of each of the leading rib end portions that tapers from a flat rear surface to a rounded front surface.

7. The collapsible wing of claim 6, wherein the elongated foam structure includes a plurality of foam structure sections, each positioned between and attached to a respective pair of the ribs.

8. The collapsible wing of claim 7, wherein:
each of the ribs is flat and elongated;
each of the ribs includes a curved upper edge and a straight lower edge to shape the cover panel in a desired aerodynamic shape; and
each of the ribs is oriented vertically on its straight lower edge.

9. The collapsible wing of claim 8, wherein each of the ribs comprises carbon fiber material.

10. The collapsible wing of claim 1, wherein:
the cover panel includes a first cover rod and a second cover rod;
the first cover rod is positioned at and extends along the first panel edge;
each of the trailing rib end portions includes a rib end opening through which the first cover rod passes to couple the first cover rod to each of the ribs;
the second cover rod is positioned at and extends along the second panel edge; and
each of the pivot arms includes a pivot arm opening through which the second cover rod passes to couple the second cover rod to each of the pivot arms.

11. The collapsible wing of claim 10, wherein:
each of the trailing rib end portions and each of the pivot arms have the same profile such that each of the pivot arms completely overlaps its respective trailing rib end portion when in the locked position;
each of the pivot arms includes a pivot arm recess to receive the first cover rod when in the locked position; and
each of the trailing rib end portions includes a rib end recess to receive the second cover rod when in the locked position.

12. The collapsible wing of claim 1, further comprising a lock rod, wherein each of the trailing rib end portions and each of the pivot arms includes a lock opening configured to be aligned for insertion of the lock rod to retain the pivot arms in the locked position and the cover panel taut.

13. The collapsible wing of claim 1, wherein the connector is an elongated foam structure having a cross-sectional profile matching a cross-sectional profile of each of the leading rib end portions that tapers from a flat rear surface to a rounded front surface.

14. The collapsible wing of claim 13, wherein the elongated foam structure includes a plurality of foam structure sections, each positioned between and attached to a respective pair of the ribs.

15. The collapsible wing of claim 1, wherein:

each of the ribs is flat and elongated;

each of the ribs includes a curved upper edge and a straight lower edge to shape the cover panel in a desired aerodynamic shape; and each of the ribs is oriented vertically on its straight lower edge.

16. The collapsible wing of claim 1, wherein each of the ribs comprises carbon fiber material.

\* \* \* \* \*